United States Patent
Chang et al.

(10) Patent No.: US 8,600,309 B2
(45) Date of Patent: Dec. 3, 2013

(54) METHODS FOR DYNAMIC CALIBRATION OF OVER-THE-AIR PATH LOSS IN OVER-THE-AIR RADIO-FREQUENCY TEST SYSTEMS

(75) Inventors: Thomas W. Chang, Sunnyvale, CA (US); Justin Gregg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 606 days.

(21) Appl. No.: 12/872,711

(22) Filed: Aug. 31, 2010

(65) Prior Publication Data
US 2012/0052815 A1    Mar. 1, 2012

(51) Int. Cl.
*H04B 17/00* (2006.01)
(52) U.S. Cl.
USPC ................................ 455/67.11; 455/67.14
(58) Field of Classification Search
None
See application file for complete search history.

(56) References Cited

U.S. PATENT DOCUMENTS

| | | |
|---|---|---|
| 6,272,322 B1 | 8/2001 | Su |
| 6,442,398 B1 | 8/2002 | Padovani et al. |
| 2002/0160717 A1 * | 10/2002 | Persson et al. ............... 455/67.1 |
| 2006/0194553 A1 * | 8/2006 | Ozaki et al. ................. 455/226.1 |
| 2007/0127559 A1 * | 6/2007 | Chang .......................... 375/213 |
| 2007/0207756 A1 | 9/2007 | Qi et al. |
| 2007/0207799 A1 * | 9/2007 | Qi et al. ........................ 455/423 |

OTHER PUBLICATIONS

Mow et al., U.S. Appl. No. 12/577,128, filed Oct. 9, 2009.
Gregg et al., U.S. Appl. No. 61/351,821, filed Jun. 4, 2010.
Gregg et al., U.S. Appl. No. 61/351,792, filed Jun. 4, 2010.
Mow et al., U.S. Appl. No. 61/329,455, filed Apr. 29, 2010.

* cited by examiner

*Primary Examiner* — Yuwen Pan
*Assistant Examiner* — Ayodeji Ayotunde
(74) *Attorney, Agent, or Firm* — Treyz Law Group; Jason Tsai

(57) ABSTRACT

Calibration equipment for calibrating multiple test stations in a test system is provided. Each test station may include a test unit, a test chamber with an over-the-air (OTA) antenna, and a radio-frequency (RF) cable that connects the test unit to the test chamber. Reference devices under test (DUTs) may be used to calibrate the OTA path loss of each test station at desired frequencies. Once calibrated, the test chambers may be used during production testing to test factory DUTs to determine whether a particular production DUT is a passing or failing DUT according to pass/fail criteria. A running average path loss value may be constantly updated based on path loss values measured using the reference DUTs and the passing production DUTs. Dynamically updating the path loss value using this statistical approach can properly track the behavior of each test station as operating conditions shift over time.

10 Claims, 7 Drawing Sheets

PATH LOSS TABLE — 54

| | SILVER DUTs (56) | | PRODUCTION DUTs (58) | |
|---|---|---|---|---|
| BAND1 | #1 · · · | #20 | #1 · · · #1003 · · · | |
| CH1 | -40.5 | -39.3 | -39.5 | NA |
| CH2 | -41.0 | -41.2 | -40.8 | N/A |
| ⋮ | | | | |

| | SILVER DUTs | | PRODUCTION DUTs | |
|---|---|---|---|---|
| BAND2 | #1 · · · | #20 | #1 · · · #1000 · · · | |
| ⋮ | | | | |

FIG. 4

METHODS FOR DYNAMIC CALIBRATION OF OVER-THE-AIR PATH LOSS IN OVER-THE-AIR RADIO-FREQUENCY TEST SYSTEMS

BACKGROUND

This relates generally to testing wireless electronic devices, and more particularly, to calibrating test equipment that is used to test wireless electronic devices.

Wireless electronic devices typically include transceiver circuitry, antenna circuitry, and other radio-frequency circuitry that provides wireless communications capabilities. During testing, wireless electronic devices under test (DUTs) can exhibit different performance levels. For example, each wireless DUT in a group of DUTs can exhibit its own output power level, gain, frequency response, efficiency, linearity, dynamic range, etc.

The performance of a wireless DUT can be measured using an over-the-air (OTA) test station. An OTA test station includes a test chamber with an OTA antenna, a test unit, and a test host. The OTA antenna is connected to the test unit and is used in sending and receiving radio-frequency (RF) signals to and from the test unit. The test host is connected to the test unit and directs the test unit to perform desired operations during testing.

During test operations, a wireless DUT is placed into the test chamber and communicates wirelessly with the OTA antenna in the test chamber. Wireless transmissions of this type experience OTA path loss between the DUT antenna and the OTA antenna.

An OTA test system typically includes multiple OTA test stations that are used to test multiple wireless DUTs in parallel. Each OTA test station typically includes its own test chamber, test unit, and test host. A production DUT is placed into the test chamber of each test station during product testing. Typical product testing involves measuring the wireless performance of each DUT and applying pass/fail criteria.

The radio-frequency path of each test station has its own unique OTA path loss characteristic. These unique path losses should be taken into account for accurate testing. In an effort to take into account these OTA path loss variations between test stations, "golden" reference DUTs are used to calibrate each test station. Golden reference DUTs are carefully selected DUTs that exhibit desired wireless performance. Typically, the performance of the golden reference DUTs changes over time. As a result, calibration of OTA path loss using the golden reference DUTs may be undesirably skewed by the performance variations in the golden reference DUTs.

It would therefore be desirable to be able to provide improved calibration techniques for calibrating OTA test systems.

SUMMARY

Test stations in an over-the-air (OTA) radio-frequency test system can be dynamically calibrated using silver reference devices under test (DUTs) and production DUTs. Each test station may include a test chamber, an OTA antenna in the test chamber, a test unit, and a test host.

Silver reference DUTs may first be used to calibrate each test station. Silver reference DUTs are wireless devices that are grossly functional. For example, a selected silver reference DUT may be placed within a test station. A silver reference DUT OTA path loss value associated with the selected silver reference DUT can be computed by the test host at desired frequencies. Multiple silver reference DUTs may be individually placed into the test station to obtain a list of silver reference DUT path loss values. The list of silver reference DUT path loss values may be recorded in a table of path loss values.

An average silver reference DUT path loss value may be obtained by computing the mean of the silver reference DUT path loss values stored in the table of path loss values. A running average OTA path loss value may be set to be equal to the average silver reference DUT path loss value prior to product testing.

During product testing, production DUTs may be tested using each test station to determine whether each production DUT satisfies pass/fail (design) criteria. If a production DUT satisfies pass/fail criteria, that production DUT will be used to determine a new OTA path loss value. Each new OTA path loss value may be recorded in the table of path loss values. If a production DUT fails, it may be discarded, and no new OTA path loss value will be calculated.

The running average path loss value may be updated based on the new path loss value. In particular, the calculation of the running average path loss value factors in path loss values obtained from passing production DUTs according to a desired weighting scheme (or a user-defined weighting scheme). For example, path loss values obtained using silver reference DUTs may be given a 90% weighting factor, whereas path loss values obtained using production DUTs may be given a 10% weighting factor. Any weighting scheme may be used, if desired. The running average path loss value may be constantly updating during product testing as new OTA path loss values are gather using passing production DUTs. Constantly updating the running average path loss value may directly affect the pass/fail criteria that are applied to each production DUT during product testing.

Dynamically updating the path loss value using this statistical approach can properly calibrate the behavior of each OTA test station as operating conditions shift over time so that offset among the different test stations is minimized.

Further features of the present invention, its nature and various advantages will be more apparent from the accompanying drawings and the following detailed description.

BRIEF DESCRIPTION OF THE DRAWINGS

FIG. 4 is an illustrative table of path loss values computed using silver reference devices under test and production devices under test in accordance with an embodiment of the present invention.

DETAILED DESCRIPTION

Wireless electronic devices include antenna and transceiver circuitry that supports wireless communications. Examples of wireless electronic devices include desktop computers, computer monitors, computer monitors containing embedded computers, wireless computer cards, wireless adapters, televisions, set-top boxes, gaming consoles, routers, or other electronic equipment. Examples of portable wireless electronic devices include laptop computers, tablet computers, handheld computers, cellular telephones, media players, and small devices such as wrist-watch devices, pendant devices, headphone and earpiece devices, and other miniature devices.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band.

Electronic devices may use short-range wireless communications links to handle communications with nearby equipment. For example, electronic devices may communicate using the WiFi® (IEEE 802.11) bands at 2.4 GHz and 5 GHz and the Bluetooth° band at 2.4 GHz. It is sometimes desirable to receive satellite navigation system signals such as signals from the Global Positioning System (GPS). Electronic devices may therefore be provided with circuitry for receiving satellite navigation signals such as GPS signals at 1575 MHz.

Figure 1:
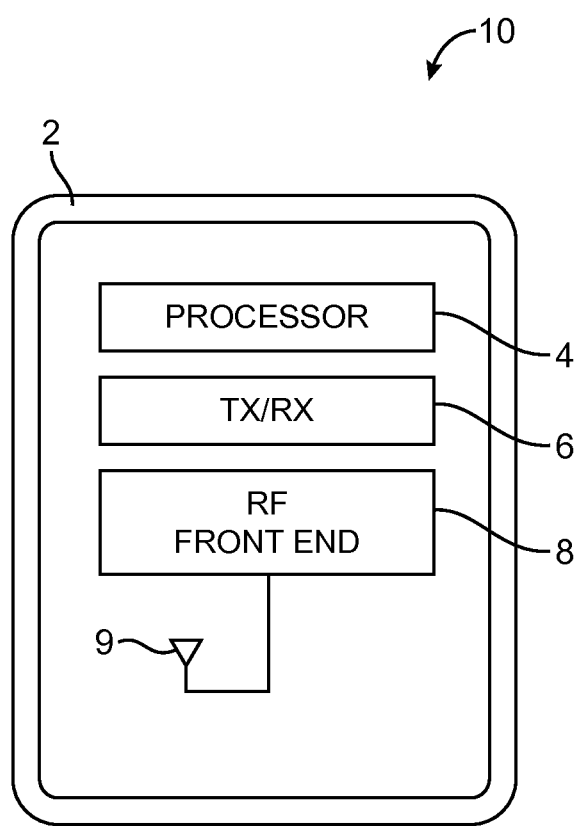
FIG. 1 is a diagram of an illustrative wireless device under test with radio-frequency circuitry in accordance with an embodiment of the present invention.

In testing environments, the wireless electronic devices are sometimes referred to as devices under test (DUTs). FIG. 1 shows an example of a test device such as DUT 10. DUT 10 may be a portable electronic device, a computer, a multimedia device, or other electronic equipment. DUT 10 may have a device housing such as housing 2 that forms a case for its associated components.

DUT 10 may have a processor such as processor 4. Processor 4 may be used in controlling the operation of DUT 10. Processor 4 may include storage and one or more processing circuits. Examples of circuits that may be used in implementing processor 4 include microprocessors, baseband processors, digital signal processors, microcontrollers, application-specific integrated circuits, etc.

Processor 4 may interact with a transceiver circuit such as transceiver circuit 6. Transceiver circuit 6 may include an analog-to-digital converter (ADC), a digital-to-analog converter (DAC), a digital down-converter (DDC), and a digital up-converter (DUC).

In a scenario in which DUT 10 is transmitting, processor 4 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to an RF front end such as RF front end 8.

When DUT 10 is receiving wireless signals, RF front end 8 may provide incoming IF analog signals to the ADC. The ADC may convert the incoming IF analog signals to incoming IF digital signals. The incoming IF digital signals may then be fed to the DDC. The DDC may convert the incoming IF digital signals to incoming baseband digital signals. The incoming baseband digital signals may then be provided to processor 4 for further processing. Transceiver circuit 6 may either up-convert baseband signals to IF signals or down-convert IF signals to baseband signals. Transceiver block 6 may therefore sometimes be referred to as an IF stage.

RF front end 8 may include circuitry that couples transceiver block 6 to one or more antenna such as antenna 9. RF front end 8 may include circuitry such as matching circuits, band-pass filters, mixers, low noise amplifier circuitry, power amplifier circuitry, etc. Processor 4, transceiver block 6, RF front end 8, and antenna 9 may be housed within housing 2.

In the scenario in which DUT 10 is transmitting, RF front end 8 may up-convert the IF analog signals from transceiver block 6 to RF analog signals (e.g., the RF signals typically have higher frequencies than the IF signals). The RF analog signals may be fed to antenna 9 for broadcast. If desired, more than one antenna may be used in DUT 10.

In the scenario in which DUT 10 is receiving wireless signals, antenna 9 may receive incoming RF analog signals from a broadcasting device such as a base transceiver station, network access point, etc. The incoming RF analog signals may be fed to RF front end 8. RF front end 8 may down-convert the incoming RF analog signals to IF analog signals. The IF analog signals may then be fed to transceiver circuit 6 for further data processing.

Figure 2:
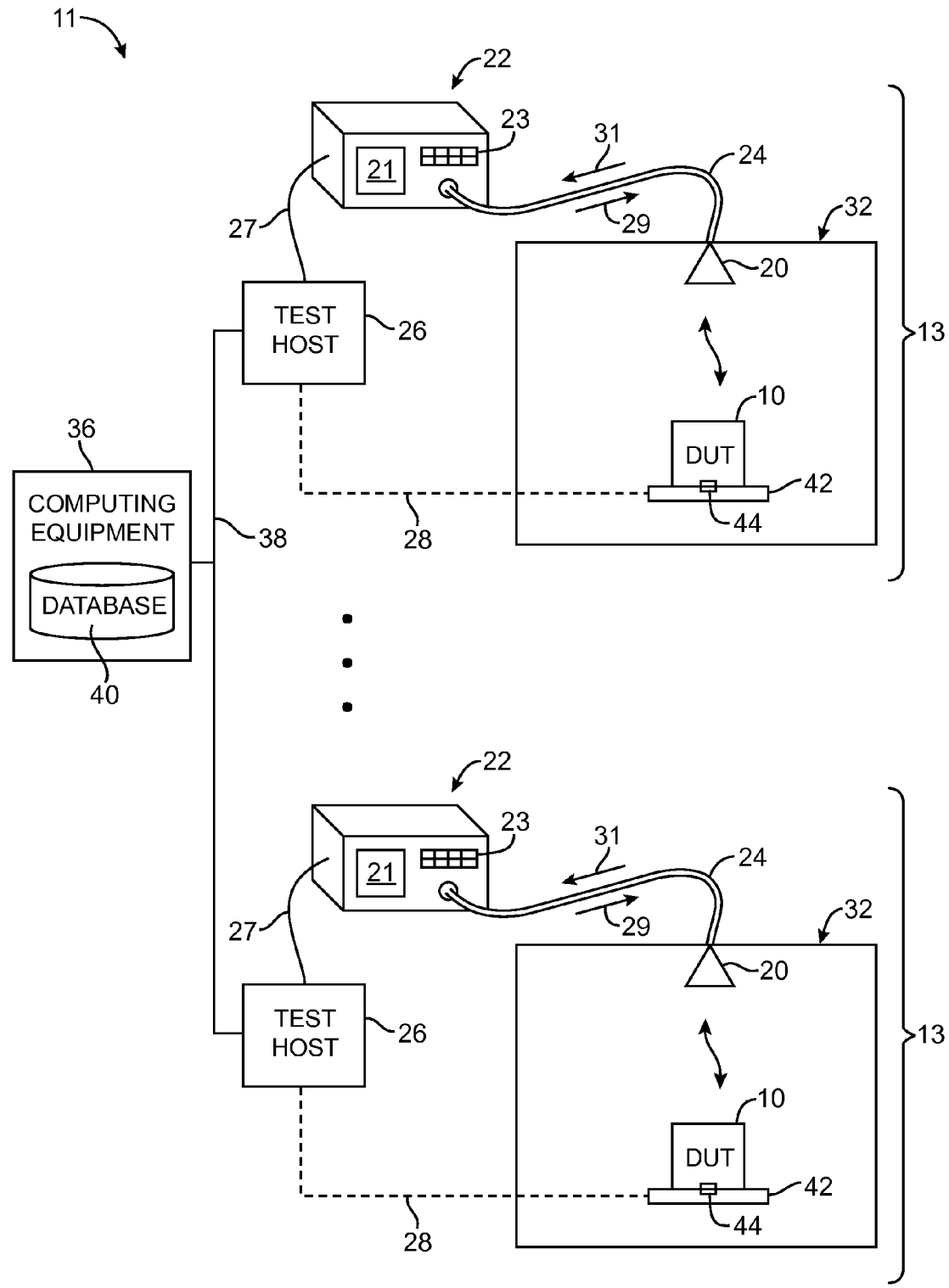
FIG. 2 is a diagram of illustrative test stations each connected to computing equipment and each including a test chamber, a test unit, and a test host in accordance with an embodiment of the present invention.

During product testing, many wireless devices (e.g., hundreds, thousands, or more of DUTs 10) may be tested in a test system such as test system 11 of FIG. 2. Test system 11 may include multiple test stations such as test stations 13. There may, for example, be 80 test stations 13 at a given test site. Test system 11 may include any desired number of test stations to achieve desired test throughput.

Each test station 13 may include a test chamber such as test chamber 32, a test unit such as test unit 22, a radio-frequency (RF) cable 24 that connects chamber 32 to test unit 22, and a test host such as test host 26 (e.g., a personal computer). Test chambers 32 may be used during product testing to measure the performance of production (factory) DUTs 10.

Each test chamber 32 may have a cubic structure (six planar walls), a rectangular prism-like structure (six rectangular walls), a pyramid structure (four triangular walls with a rectangular base), or other suitable structures.

Test chambers 32 may each have an over-the-air (OTA) antenna such as OTA antenna 20 mounted inside the chamber. OTA antenna 20 may, for example, be a patch antenna, a horn antenna, or other types of antennas. During product testing, DUT 10 may be placed inside test chamber 32 to test for the performance (e.g., the output power level, etc.) of DUT 10 while OTA antenna 20 communicates wirelessly with antenna(s) 9 of DUT 10.

Test unit (tester) 22 in each test station 13 may be a radio communications tester of the type that is sometimes referred to as a test box or a radio communications tester. Test unit 22 may be used to perform radio-frequency signaling tests for a variety of different radio-frequency communications bands and channels.

Test unit 22 may be operated directly or via computer control (e.g., when test unit 22 receives commands from test host 26). When operated directly, a user may control test unit 22 by supplying commands directly to the test unit using the user input interface of the test unit. For example, a user may press buttons in a control panel 23 on the test unit while viewing information that is displayed on a display 21 in the test unit. In computer controlled configurations, a test host such as computer 26 (e.g., software running autonomously or semi-autonomously on the computer) may communicate with the test unit (e.g., by sending and receiving data over a wired path 27 or a wireless path between the computer and the test unit).

Test host 26 may be coupled to DUT 10 through wired path 28 or a wireless path between test host 26 and DUT 10. Connected in this way, test host 26 may send commands over path 28 to configure DUT 10 to perform desired operations during path loss calibration operations and during product testing.

In one suitable arrangement, test host 26 may be connected to a test fixture such as test fixture 42 through path 28 (see, e.g., FIG. 2). Fixture 42 may have an RF connector such as RF connector 44 mounted on its surface. DUT 10 may have a corresponding RF connector that is used to mate with RF connector 44 during testing. In the mated state, data may be conveyed between test host 26 and DUT 10 over path 28.

Test unit 22 may be connected to OTA antenna 20 of test chamber 32 through RF cable 24. Test station 13 with test unit 22 connected to OTA antenna 20 of test chamber 32 using RF cable 24 in this way may be used to perform OTA testing of wireless electronic devices. For example, a DUT 10 may be placed within test chamber 32 during product testing. In this arrangement, RF signals may be conveyed between transceiver circuitry 6 of DUT 10 and test unit 22.

Test unit 22 may be used to characterize uplink and downlink behaviors of DUT 10. During uplink characterization, DUT 10 may send wireless signals through RF cable 24 in the direction of arrow 31. Test unit 22 may be used to measure an output power level, frequency response, gain, linearity, and other performance parameters of DUT 10 at desired frequencies.

During downlink characterization, test unit 22 may be used to send wireless signals through RF cable 24 in the direction of arrow 29. Measurements such as a receive power level may then be taken at DUT 10. Test stations 13 may therefore be referred to as bidirectional, because test stations 13 can be used to measure both uplink and downlink characteristics.

Each test station 13 should be calibrated prior to testing to ensure that measurements taken across the different test stations are consistent with one another. Sources of offset (error) that may exist from one test station to another include OTA path loss (e.g., path loss associated with the propagation of radio-frequency signals as they propagate through air, path loss associated with the behavior of each OTA antenna 20 during actual wireless transmission, etc.), RF cable path loss (e.g., path loss associated with each RF cable 24), and variations in each test unit 22 (e.g., process, voltage, and temperature variations that may affect the operation of each tester).

Path loss can be defined as the attenuation in power as wireless signals propagate through a particular medium. The OTA path loss and RF cable path loss in each test station 13 are typically unique, because it is challenging to manufacture test components (e.g., OTA antennas 20, RF cables 24, etc.) that are exactly identical to one another and to configure each test station 13 with an identical spatial arrangement. Path loss may be sensitive to the location of OTA antenna and to the placement of DUT 10 within the test chamber.

Similarly, the manufacturing of identical test units 22 may be equally if not even more challenging. In addition to manufacturing variations, operational variations such as voltage and temperature variations may cause each test unit 22 to behave differently during actual testing conditions.

As a result, it may be necessary to take into account an overall test station path loss (e.g., it is necessary to calibrate the OTA path loss, RF cable path loss, and test unit variations) when calibrating a test station 13.

Uplink and downlink path loss may be approximately equal for wireless devices that support time division duplexing (TDD) protocols such as IEEE 802.11 protocols (sometimes referred to as WiFi® protocols), the Bluetooth° protocol, etc. For example, wireless devices that support time division duplexing protocols may exhibit an uplink path loss of 29 dB and a downlink path loss of 29 dB. For TDD systems, calibration of only one path (i.e., calibration of uplink path loss or downlink path loss) is necessary, because the transmit circuitry and receive circuitry operate at the same frequency.

Calibration techniques that take into account the OTA path loss, RF cable path loss, and test unit variations of each test station 13 is desirable. To calibrate different test stations 13 in test system 11, silver reference DUTs may initially be used to reliably calibrate each test station 13 prior to testing production DUTs 10. Silver reference DUTs are DUTs that have been determined to be grossly functional. An average silver reference DUT OTA path loss value may be computed based on the mean of the path loss values measured using silver reference DUTs 10. A running average OTA path loss value may be set to be equal to the average silver reference DUT OTA path loss prior to product testing.

After the initial calibration operations using the silver reference DUTs, production DUTs 10 may be tested to determine whether each production DUT 10 satisfies pass/fail (design) criteria. Production DUTs 10 that satisfy the pass/fail criteria may be used to compute a new OTA path loss value, and the running average OTA path loss value may be updated based on the new OTA path loss value. Production DUTs 10 that do not satisfy the pass/fail criteria may be discarded and may not affect the value of the running average OTA path loss. Pass/fail criteria applied to each subsequent production DUT may be based on the most up-to-date running average path loss value.

Figure 3:
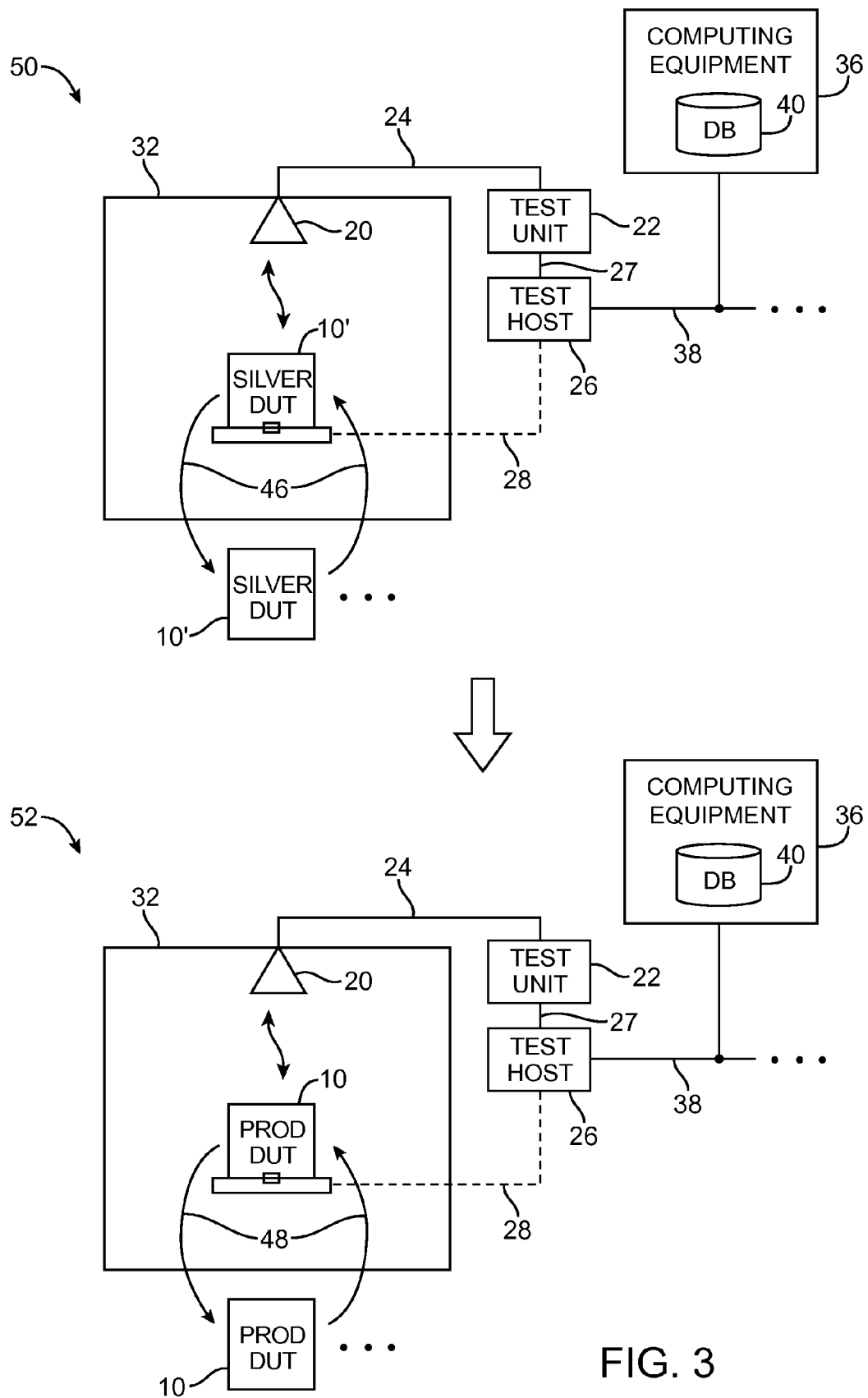
FIG. 3 is a diagram showing steps involved in calibrating over-the-air path loss for each test station in accordance with an embodiment of the present invention.

As shown in step 50 of FIG. 3, silver reference DUTs 10' may be used to calibrate the path loss of test chamber 32. For example, consider a scenario in which a silver reference DUT is used to characterize a test chamber uplink path loss. The silver reference DUT may, as an example, be directed by test host 26 to output a precise known output power level of 15 dBm. Power in terms of dBm expresses power relative to 1 mW in units of decibels. The silver reference DUT may be placed within a first test chamber 32 of a first test station 13. A first test unit 22 of first test station 13 may be used to measure the output power level of the wireless signals that are transmitted from the silver reference DUT. First test unit 22 may measure a receive power level of −25.5 dBm (as an example). The uplink path loss of first test station 13 may therefore have a value of −40.5 dB (−25.5 minus 15).

To calibrate another test station, the silver reference DUT may be place within a second test chamber 32 of a second test station 13 and may similarly be configured to output the known output power level of 15 dBm. A second test unit 22 of second test station 13 may be used to measure the output power level of the wireless signals that are transmitted from the silver reference DUT. Second test unit 22 may measure a receive power level of −22.3 dBm (as an example). The uplink path loss of second test station 13 may therefore have a value of −37.3 dB (−22.3 minus 15).

The uplink path loss values of each test station 13 may be measured across different operating frequencies using this approach. The downlink path loss may be equal to the uplink path loss (as an example). If desired, silver reference DUTs may similarly be used to measure the downlink OTA path loss.

Multiple silver reference DUTs 10' may be switched into test chamber 32 to calibrate each test chamber 32 to ensure accuracy of the calibration process (see, e.g., arrows 46 in step 50 of FIG. 3). For example, 20 silver reference DUTs 10' may be used to calibrate the OTA path loss of each test chamber during step 50. If desired, more than 20 or less than 20 silver reference DUTs 10' can be used to measure the path loss of test chamber 32. Each silver reference DUT 10' may be used to compute a silver reference DUT OTA path loss. Upon completion of step 50, an average silver reference DUT OTA path loss value may be computed based on the OTA path loss values measured using the multiple silver reference DUTs 10'. A running average OTA path loss value may initially be set to be equal to the average silver reference DUT OTA path loss value.

After calibrating each test station 13 using silver reference DUTs 10', each test station 13 may be used to test production DUTs 10, as shown in step 52 of FIG. 3. On a given day, hundreds or thousands of production DUTs 10 may be individually placed into test chamber 32 for testing (see, e.g., arrows 48 in step 52 of FIG. 3). At step 52, production DUTs 10 may be tested to determine whether they satisfy pass/fail criteria. If a production DUT 10 passes the pass/fail criteria, that production DUT 10 is used to measure a new OTA path loss value. The running average OTA path loss value may be updated based on the new OTA path loss value. If a production DUT 10 fails the pass/fail criteria, the running average OTA path loss value remains unchanged.

Test station OTA path loss values gathered from each test chamber using silver reference DUTs and production DUTs may be tabulated in an OTA path loss table such as table 54, as shown in FIG. 4. Path loss table 54 may have path loss values corresponding to different operating frequencies (e.g., table 54 may have path loss values for each channel in each band) for each test station 13.

For example, consider a scenario in which 20 silver reference DUTs 10' are used to initially calibrate each test chamber 32 before production testing. As shown in region 56 of FIG. 4, silver reference DUT #1 may be used to compute OTA path loss values of −40.5 dB and −41.0 dB at channels CH1 and CH2, respectively, in band BAND1. Silver reference DUT #20 may be used to compute OTA path loss values of −39.3 dB and −41.2 dB at channels CH1 and CH2, respectively, in band BAND1. Path loss values computed at a particular frequency (channel) may vary from one silver reference DUT to the next, because silver reference DUTs (e.g., silver reference DUTs #1-#20) may exhibit slight performance differences. Path loss values may be measured at desired frequencies (i.e., for any number of bands and channels) for any number of test chambers.

An average silver reference DUT test station OTA path loss value may be computed based on the mean of the path loss values in region 56 of FIG. 4 at each desired frequency (e.g., each row of silver reference DUT path loss values may be used to compute a corresponding average silver reference DUT path loss value). For example, the average silver reference DUT path loss value for CH1/BAND1 may be equal to −39.9 dB (e.g., the arithmetic mean of the path loss values measured using silver reference DUTS #1-#20), whereas the average silver reference DUT path loss value for CH2/BAND1 may be equal to −41.1 dB.

Prior to product testing, a running average path loss value may be set to be equal to the average silver reference DUT path loss value. The running average path loss value may be updated dynamically based on new path loss values computed using passing production DUTs.

During product testing, path loss values computed using passing production DUTs are recorded in region 58 of table 54 (see, e.g., FIG. 4). There may be hundreds or thousands of production DUTs that are tested on a daily basis. For example, production DUT #1 may be a passing DUT and may be used to record a new path loss value of −39.5 dB for CH1/BAND1 and −40.8 dB for CH2/BAND1. Production DUT #1003 may be a failing DUT, and no new path loss value will be recorded in table 54. New path loss values measured using valid (passing) production DUTs may continually change the running average path loss value to reflect most recent calibrated path loss characteristics.

The calculation of the running average path loss value during product testing may be computed based on a desired weighting scheme. For example, the path loss contribution from the silver reference DUTs may be given a weighting factor of 90%, whereas the path loss contribution from the production DUTs may be given a weighting factor of 10%. For example, consider a scenario in which the average silver reference DUT path loss value is equal to −40.4 dB and the average production DUT path loss value (e.g., a path loss value calculated based on passing production DUTs, including the most recent valid production DUT) is equal to −41.3 dB. The running average path loss may therefore be calculated to be equal to −40.49 dB (−40.4*90%+−41.3*10%). If desired, any other weighting scheme may be used to calculate the running average path loss. The running average path loss is relevant, because pass/fail criteria for each subsequent production DUT uses the most updated running average path loss value.

As shown in FIGS. 2 and 3, each test station 13 may be connected to computing equipment 36 through line 38. Computing equipment 36 may include storage equipment on which a database 40 is stored. Table 54 may be stored in database 40.

Figure 5:
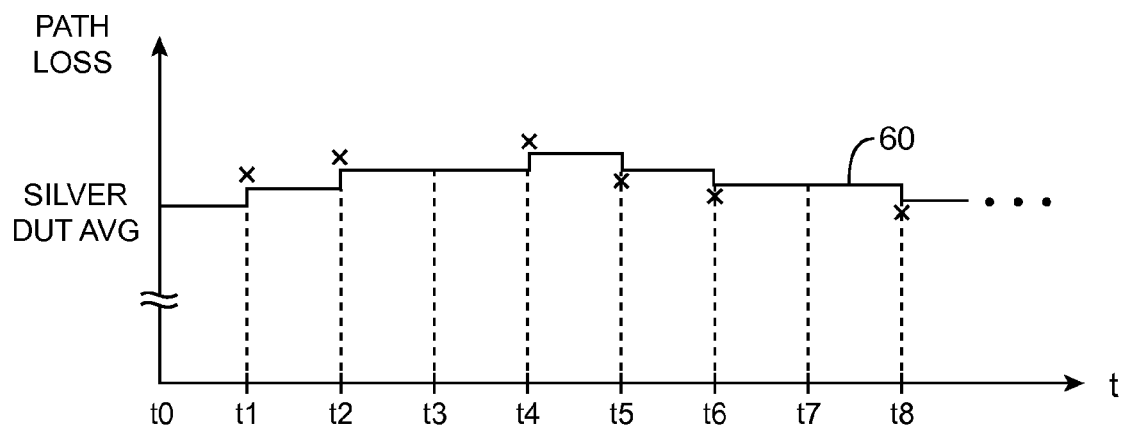
FIG. 5 is an illustrative graph showing how a running average path loss value may change over time during product testing in accordance with an embodiment of the present invention.

FIG. 5 is an illustrative graph showing how the running average OTA path loss value may change over time (see, e.g., line 60 in FIG. 5). At time t0 (prior to product testing), the running average path loss may be equal to the average silver reference DUT path loss. At time t1, production DUT #1 is tested, satisfies pass/fail criteria, and is used to compute a first new path loss value. The first new path loss value is indicated by the symbol "x" corresponding to time t1 in the graph of FIG. 5. The first new path loss value may be used to update the running average path loss according to the desired weighting scheme as described in connection with FIG. 4 (see, e.g., the change in the vertical value of line 60 at time t1). This updated path loss value will directly impact the pass/fail criteria that are applied to the next production DUT.

At time t2, production DUT #2 is tested, satisfies the pass/fail criteria, and is used to compute a second new path loss value. The second new path loss value may be used to update the running average path loss according to the desired weighting scheme (see, e.g., the change in the vertical value of line 60 at time t2).

At time t3, production DUT #3 is tested an fails to satisfy the pass/fail criteria. As a result, production DUT #3 may be discarded, and the running average path loss value remains constant. The running average path loss value may be constantly updating in this way during product testing. Dynamically updating the path loss value using this statistical approach can properly calibrate the behavior of each OTA test station as operating conditions shift over time so that offset among the different test stations is minimized.

Figure 6:
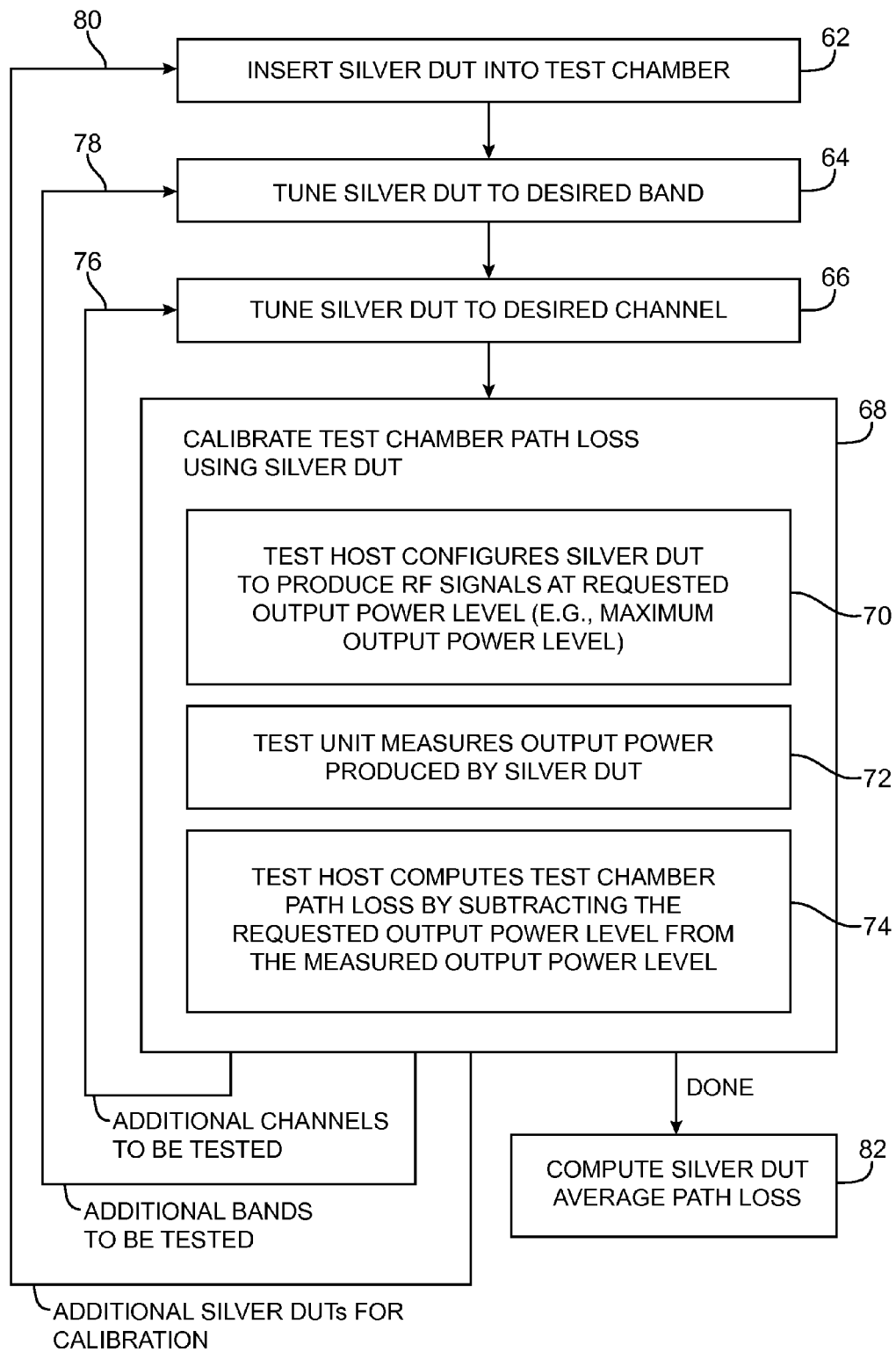
FIG. 6 is a flow chart of illustrative steps involved in computing an average silver reference device under test over-the-air path loss value in accordance with an embodiment of the present invention.

FIG. 6 shows detailed steps involved in calibrating test chamber 32 using silver reference DUTs 10'. At step 62, silver reference DUT 10' may be placed into test chamber 32. At step 64, silver reference DUT 10' may be tuned to a desired frequency band. At step 66, silver reference DUT 10' may be tuned to a desired channel within the desired frequency band.

At step 68, silver reference DUT 10' may be used to characterize the uplink behavior of test chamber 32 (e.g., to determine a silver reference DUT test station OTA path loss value). Test host 22 may configure DUT 10' to produce RF signals at a requested output power level (step 70). For example, test host 22 may direct DUT 10' to produce RF signals at the maximum output power level (tested power level) by sending commands over line 28. Test unit 22 may then be used to measure the output power level produced by DUT 10' (step 72). Test host 26 may compute a silver reference DUT path loss by subtracting the requested output power level from the measured output power level (step 74).

Processing may loop back to step 66 if there are additional channels to be tested, as indicated by path 76. Processing may loop back to step 64 if there are additional bands to be tested, as indicated by path 78. If desired, additional silver reference DUTs 10' may be used to calibrate test chamber 32 for increased accuracy, as indicated by path 80.

When the desired number of silver reference DUTs have been used to calibrate the path loss characteristic of test chamber 32, test host 26 may compute an average silver reference DUT path loss value according to the path los values stored in region 56 of table 54 by retrieving data from database 40 (step 82). A running average OTA path loss value may be set to be equal to the average silver reference DUT OTA path loss value upon completion of step 82.

Figure 7:
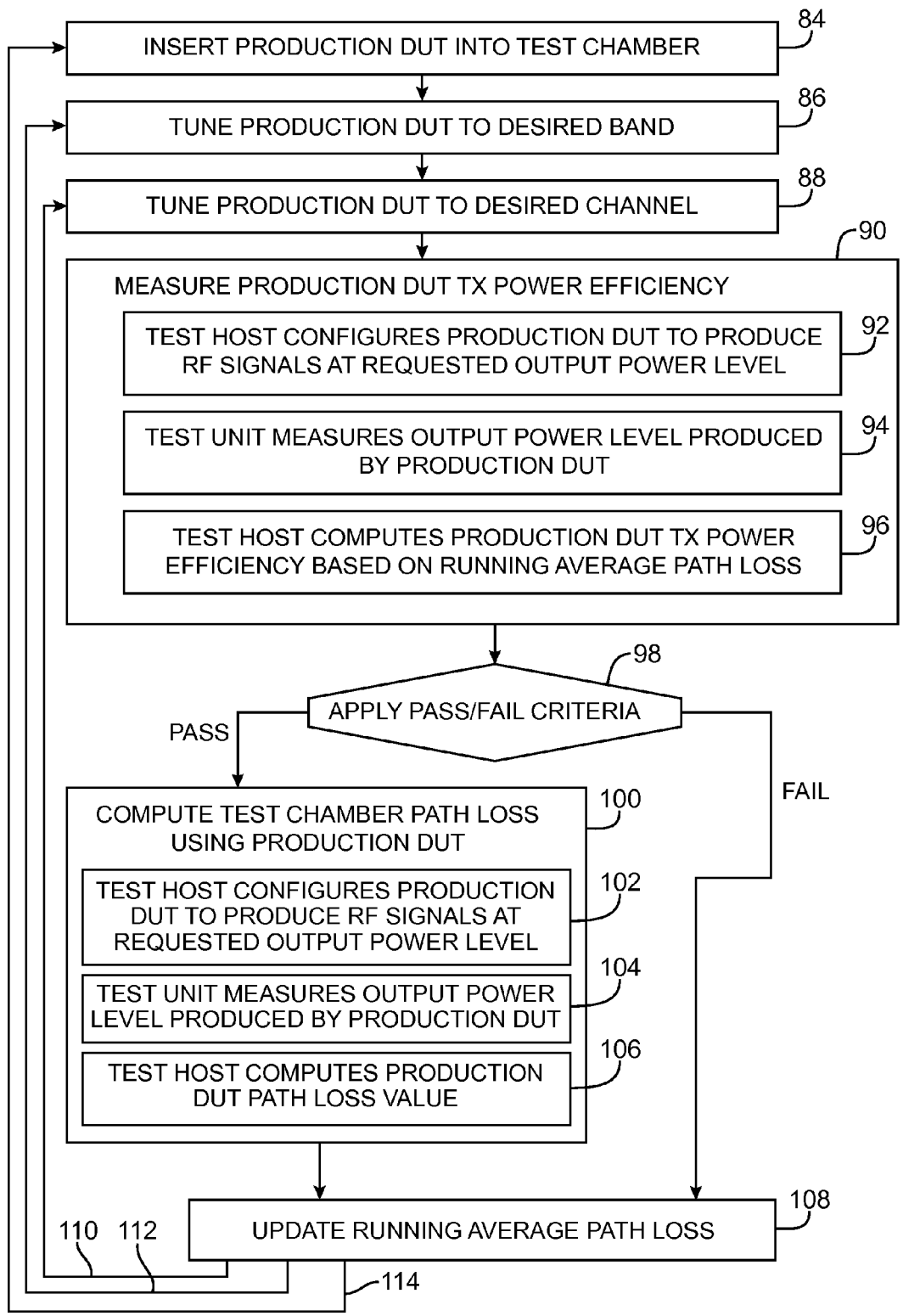
FIG. 7 is a flow chart of illustrative steps involved in dynamically calibrating test station path loss values during product testing in accordance with an embodiment of the present invention.

FIG. 7 shows detailed steps involved in testing production DUTs and dynamically updating the running average path loss value based on measurements gathered from production DUTs that satisfy pass/fail criteria. At step 84, production DUT 10 may be placed into test chamber 32. step 86, production DUT 10 may be tuned to a desired frequency band. At step 88, production DUT 10 may be tuned to a desired channel within the desired frequency band.

At step 90, the transmit (TX) power level (efficiency) of production DUT 10 may be computed. For example, test host 22 may configure DUT 10 to produce RF signals at a maximum output power level (step 92) by sending commands over line 28. Test unit 22 may then be used to measure the output power level produced by DUT 10 (step 94). Test host 26 may then compute the TX power level of production DUT 10 by subtracting the running average path loss value from the power level measured by test unit 22. The computed TX power level may be compared with the requested maximum power level to determine whether that production DUT 10 passes the pass/fail criteria.

For example, consider a scenario in which the desired maximum output power is 20 dBm, the running average path loss value is −40.3 dB, and the power level measured by test unit 22 is −22.3 dBm. The TX power level is therefore equal to 18 dBm (−22.3 minus −40.3). A TX power loss of 2 dB (20 minus 18) may be acceptable, and production DUT 10 may be marked as a passing DUT. Consider another scenario in which the desired maximum output power is 20 dBm, the running average path loss value is −40.3 dB, and the power level measured by test unit 22 is −26.1 dBm. The TX power level is therefore equal to 14.2 dBm (−26.1 minus −40.3). A TX power loss of 5.8 dB (20 minus 14.2) may be unacceptable, and production DUT 10 may be marked as a failing DUT.

If production DUT 10 satisfies the pass/fail criteria, it may proceed to step 100. At step 100, passing DUT 10 may be used to measure the behavior of test chamber 32. Test host 22 may direct DUT 10 to produce RF signals at a requested output power level (step 102). Test unit 22 may then measure the output power level produced by DUT 10 (step 104). Test host 26 may then compute a new production DUT path loss value by subtracting the requested output power level from the measured output power level (step 106). If production DUT 10 does not satisfy the pass/fail criteria, no new path loss value will be computed.

At step 108, the running average path loss value is updated to take into account the new production DUT path loss value that has most recently been obtained. Processing may loop back to step 88 if there are additional channels to be tested, as indicated by path 110. Processing may loop back to step 86 if there are additional bands to be tested, as indicated by path 112. Additional production DUTs (e.g., hundreds or thousands of DUTs) may be tested in test chambers 32 using this approach, as indicated by path 114.

The foregoing is merely illustrative of the principles of this invention and various modifications can be made by those skilled in the art without departing from the scope and spirit of the invention.

What is claimed is:

1. A method of calibrating a test station, wherein the test station includes a test chamber having an antenna, a test unit, and a radio-frequency cable that connects the antenna to the test unit, the method comprising:
    performing measurements with a plurality of reference devices under test to obtain reference device under test path loss values associated with radio-frequency signals passing between the antenna and the reference devices under test within the test chamber;
    with the test station, testing a production device under test to determine whether the production device under test satisfies design criteria;
    in response to determining whether the production device under test satisfies the design criteria, performing measurements with the production device under test to obtain a production device under test path loss value associated with radio-frequency signals passing between the antenna and the production device under test; and
    calibrating the test station by computing a running average path loss value based on the reference device under test path loss values and the production device under test path loss value.

2. The method defined in claim 1, further comprising:
    computing an average reference device under test path loss value based on the reference device under test path loss values.

3. The method defined in claim 2, wherein computing the running average path loss value based on the reference device under test path loss values and the production device under test path loss value comprises:
    multiplying the average reference device under test path loss value by a reference device under test weighting factor to obtain a first value;
    multiplying the production device under test path loss value by a production device under test weighting factor to obtain a second value;
    calculating the running average path loss value by summing the first and second values.

4. The method defined in claim 3, further comprising:
    with the test station, testing additional production devices under test.

5. The method defined in claim 4, further comprising:
    updating the running average path loss value based on production device under test path loss values gather from the additional production devices under test that satisfy the design criteria.

6. The method defined in claim 1, wherein computing the running average path loss value comprises computing an uplink path loss value for the test chamber.

7. The method defined in claim 1, wherein the test station is connected to computing equipment, the method further comprising:
   storing the reference device under test path loss values and the production device under test path loss value on a database that is stored on the computing equipment; and
   with a test host, retrieving the reference device under test path loss values and the production device under test path loss value from the database to compute the running average path loss value.

8. The method defined in claim 1, wherein the reference device under test path loss values and the production device under test path loss value comprise over-the-air path loss values and wherein calibrating the test station comprises characterizing an over-the-air path loss associated with the test chamber.

9. A method of calibrating a test station in an over-the-air test system, wherein the test station includes a test chamber having an antenna, a test unit, and a radio-frequency cable that connects the antenna to the test unit, the method comprising:
   calibrating the test station using a plurality of reference devices under test;
   performing measurements with the plurality of reference devices under test to obtain reference device under test over-the-air path loss values;
   testing a production device under test to determine whether the production device under test satisfies pass-fail criteria;
   performing measurements with the production device under test to obtain a production device under test over-the-air path loss value; and
   in response to determining that the production device under test satisfies the pass-fail criteria, updating the pass-fail criteria, wherein updating the pass-fail criteria comprises computing a running average over-the-air path loss value based on the reference device under test over-the-air path loss values and the production device under test over-the-air path loss value.

10. The method defined in claim 9, wherein testing the production device under test to determine whether the production device under test satisfies the pass-fail criteria comprises measuring a transmit power efficiency level associated with the production device under test.

* * * * *